No. 734,741. PATENTED JULY 28, 1903.
H. M. PARHAM.
INKING ROLLER.
APPLICATION FILED DEC. 17, 1902.
NO MODEL.

Witnesses
C. H. Walker.
Geo. E. Tew.

Inventor
Horace M. Parham
By Milo B. Stevens & Co
Attorneys

No. 734,741.

Patented July 28, 1903.

UNITED STATES PATENT OFFICE.

HORACE MILTON PARHAM, OF CHARLESTON, SOUTH CAROLINA.

INKING-ROLLER.

SPECIFICATION forming part of Letters Patent No. 734,741, dated July 28, 1903.

Application filed December 17, 1902. Serial No. 135,618. (No model.)

*To all whom it may concern:*

Be it known that I, HORACE MILTON PARHAM, a citizen of the United States, residing at Charleston, in the county of Charleston and State of South Carolina, have invented certain new and useful Improvements in Inking-Rollers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention comprises a device for adjusting the inking-rollers of printing-presses.

The object thereof is to form a device suitable for adjusting the inking-rollers to the height of the type in the form or according to the size of the roller. New rollers are commonly somewhat larger in diameter than old or worn ones, and it is essential, to prevent cutting of the rollers by rules or sharp type and to get a good impression, that the rollers be properly adjusted to the type height. This is particularly necessary in doing cut and half-tone prints and in other cases where nice work is desired. What are known as "barriers" are now in use locked in each end of the chase to prevent the rollers bearing so hard on the form; but they are easily destroyed and mashed by the grippers, and they are also apt to tear the ends of the rollers.

My invention is designed to make the use of the barriers unnecessary and to maintain the rollers at proper adjustment under all circumstances by the use of adjustable or expansible trucks or wheels on the ends of the roller stock or arbor, which trucks travel on the tracks on each side of the bed. In other words, I substitute expansible trucks for the solid trucks now in use.

The device is illustrated in the accompanying drawings, in which—

Figure 1:
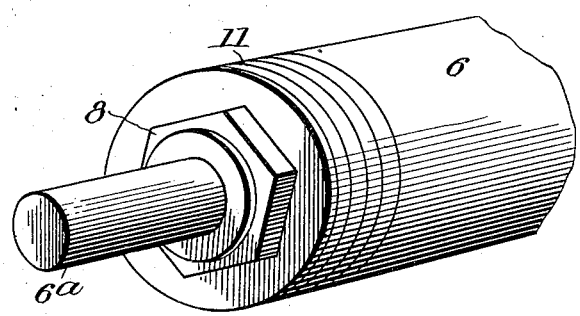
Figure 2:
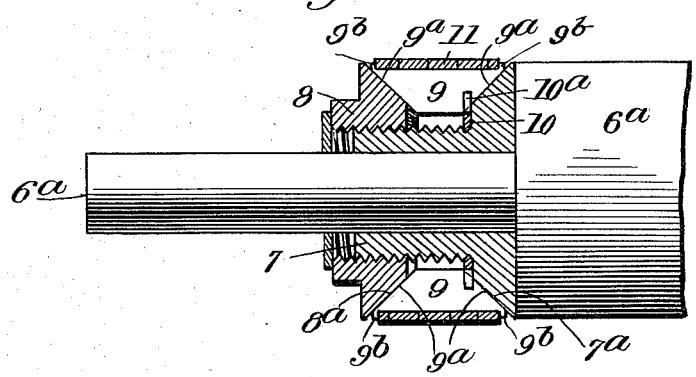
Figure 3:
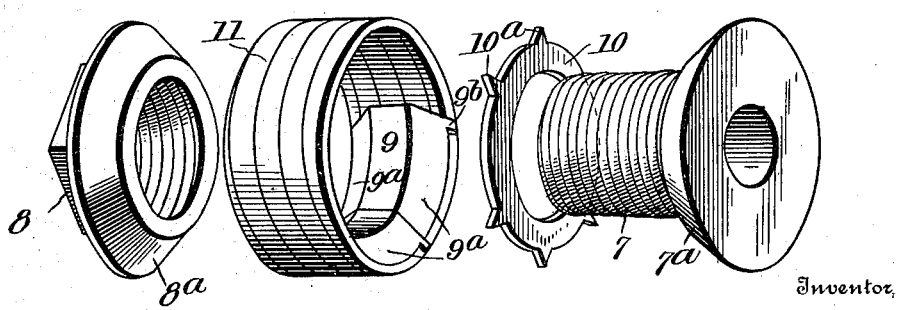

Figure 1 is a perspective view of one end of an inking-roller provided with my improvement. Fig. 2 is a longitudinal section thereof, and Fig. 3 is a perspective view of the separate parts of my improved truck.

Referring specifically to the drawings, 6 indicates the inking-roller, and $6^a$ the arbor or stock thereof. The truck invented by me consists of bolt 7, screw-threaded and having an expanding or conical head $7^a$; a nut 8, fitting the bolt and having a beveled or expanding face $8^a$ opposing the face $7^a$ of the head of the bolt; segments 9, arranged around the bolt and having beveled faces $9^a$ to engage the inclined faces of the nut and the bolt-head; a washer 10, having points $10^a$, which when the segments are expanded enter between the same and retain them at the same proper space apart, and a coiled expansible bearing ring or rim 11, which surrounds and confines the segments and travels directly on the tracks beside the bed of the press. The bolt is bored to fit over the arbor of the roller, to which it may be keyed or otherwise secured. The rim 11 is formed of spring metal having a tendency to contract and is held in place on the segments by lips or flanges $9^b$ at the ends of the segments.

In use by turning the nut the segments and rim expand or contract accordingly, thereby varying the diameter of the rim and truck, whereby it may be adjusted according to the size of the roller and the other local conditions.

What I claim as new, and desire to secure by Letters Patent, is—

1. The combination with an inking-roller, of an expansible truck thereon, comprising a nut and bolt having opposing inclined faces, flanged segments therebetween having corresponding inclined faces, and an expansible rim around the segments, retained between the flanges.

2. The combination with an inking-roller, of a bolt and nut sleeved on the arbor thereof and having opposite inclined faces, wedge-shaped segments between the faces, a washer on the bolt having spaced projections between the segments, and an expansible rim around the segments.

In testimony whereof I affix my signature in presence of two witnesses.

HORACE MILTON PARHAM.

Witnesses:
T. L. BISSELL,
R. S. WHALEY.